United States Patent
Petrovic

(10) Patent No.: US 7,714,760 B2
(45) Date of Patent: May 11, 2010

(54) APPARATUS AND METHODS FOR DIRECT QUADRATURE SAMPLING

(75) Inventor: Branislav Petrovic, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 28 days.

(21) Appl. No.: 12/163,962

(22) Filed: Jun. 27, 2008

(65) Prior Publication Data

US 2009/0322578 A1    Dec. 31, 2009

(51) Int. Cl.
*H03M 1/12* (2006.01)
(52) U.S. Cl. .................. 341/155; 375/340; 375/316
(58) Field of Classification Search .................. 341/122, 341/155; 375/261, 316, 340
See application file for complete search history.

(56) References Cited

U.S. PATENT DOCUMENTS

| | | | |
|---|---|---|---|
| 5,142,553 A * | 8/1992 | Rosenkranz | 375/316 |
| 6,525,857 B1 | 2/2003 | Way et al. | |
| 6,581,165 B1 | 6/2003 | Weintraub | |
| 6,600,438 B2 | 7/2003 | Hilton | |
| 2004/0028151 A1* | 2/2004 | Arambepola et al. | 375/316 |
| 2004/0264600 A1* | 12/2004 | Kao et al. | 375/316 |
| 2007/0263673 A1* | 11/2007 | Agazzi et al. | 370/516 |
| 2008/0114250 A1 | 5/2008 | Urbano et al. | |

FOREIGN PATENT DOCUMENTS

JP    2005159640 A    *    6/2005

OTHER PUBLICATIONS

Ziomek, C.; Corredoura, P.; Digital I/Q Demodulator; Particle Accelerator Conference, 1995., Proceedings of the 1995; May 1-5, 1995, pp. 2663-2665, vol. 4: IEEE, Publications Office, 10662 Los Vaqueros Circle, Los Alamitos, CA 90720-1264, USA; Dallas, TX, USA.

* cited by examiner

*Primary Examiner*—Howard Williams
(74) *Attorney, Agent, or Firm*—Bruce W. Greenhaus; Mark Olds

(57) ABSTRACT

Methods and apparatuses are provided for performing direct quadrature sampling. One method for sampling quadrature baseband components of a bandpass signal includes receiving a bandpass signal, sampling the bandpass signal using a first sampling clock and a second sampling clock, where the first and the second sampling clocks have the same frequency and are offset by a predetermined phase, and aligning the sampled signals temporally to produce in-phase and quadrature samples corresponding to baseband in-phase and quadrature components. An apparatus for directly sampling baseband quadrature components of a bandpass signal is also presented, which includes a first analog-to-digital converter (ADC) configured to receive a bandpass signal, a second ADC configured to receive the bandpass signal, where the second ADC has a clock having a phase offset with respect to clock signal of the first ADC, and an interpolator coupled to the first ADC configured provide coincident samples.

31 Claims, 10 Drawing Sheets

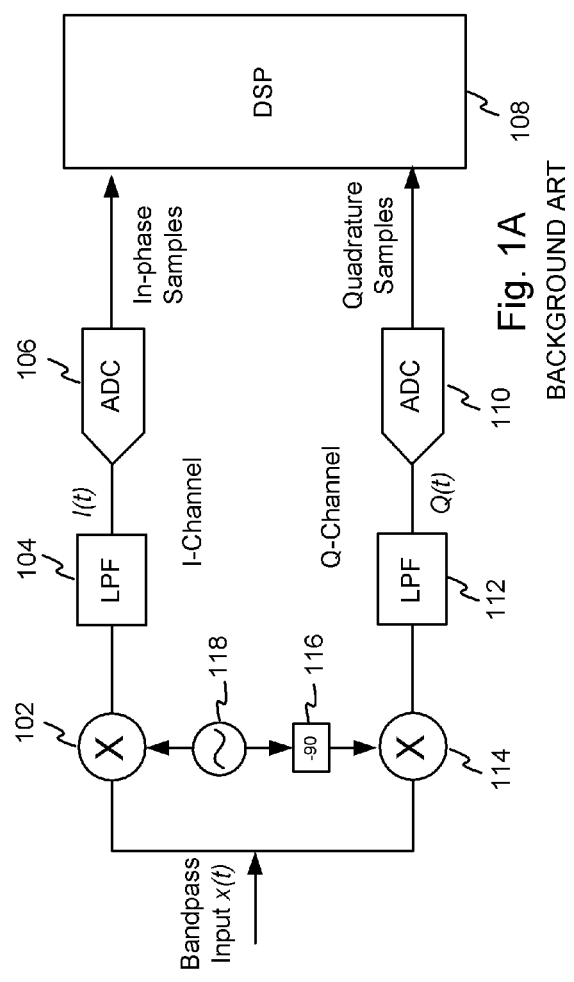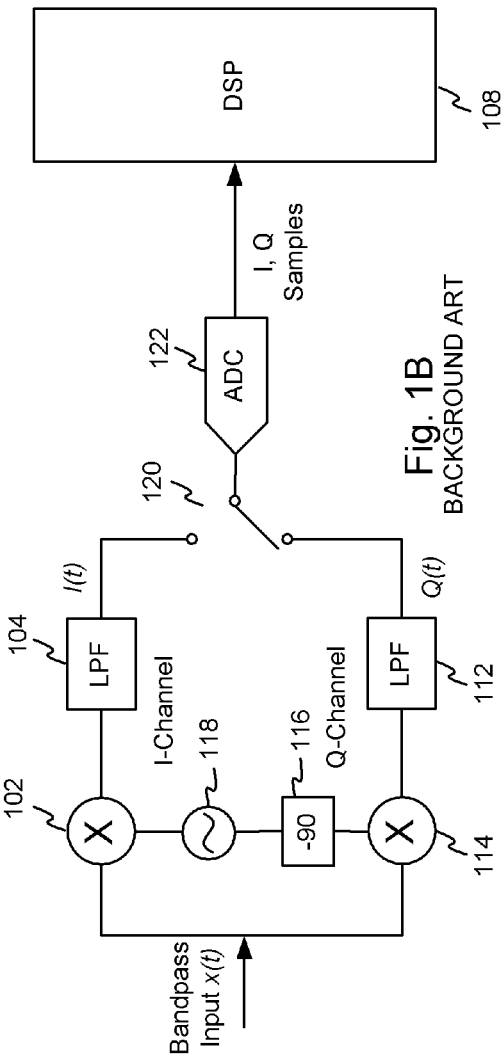

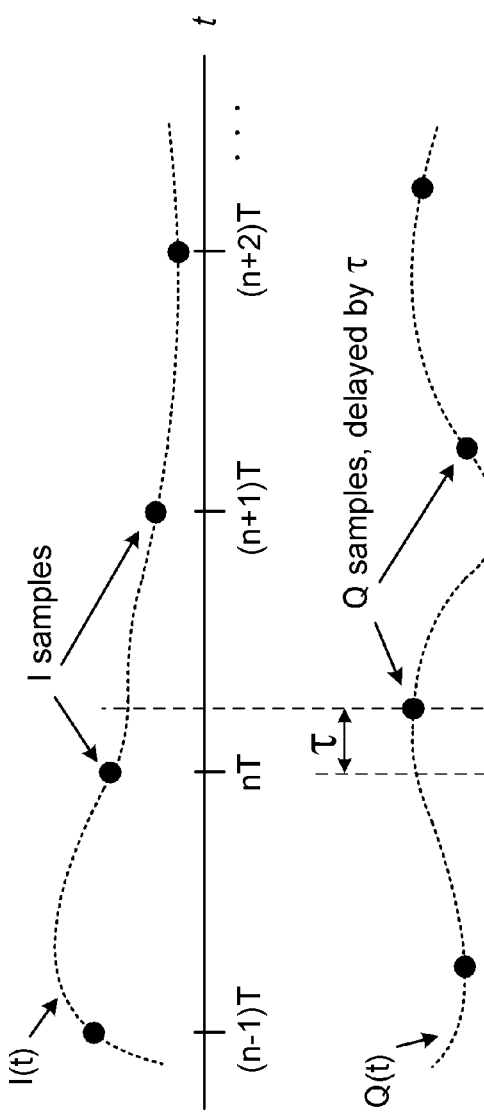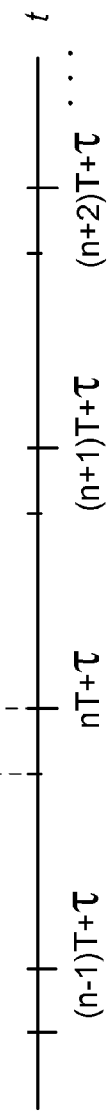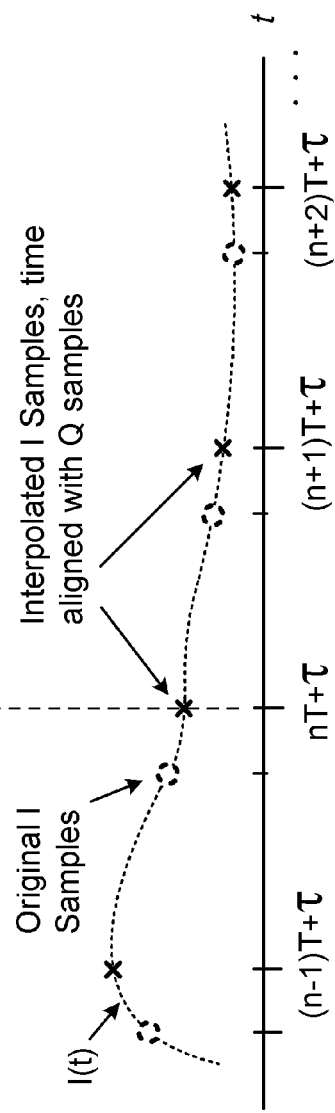

APPARATUS AND METHODS FOR DIRECT QUADRATURE SAMPLING

FIELD OF DISCLOSURE

The present disclosure is related to the sampling of bandpass signals, and more specifically, to the direct analog-to-digital conversion of broadband quadrature signals.

BACKGROUND

A wide variety of applications utilize quadrature signal processing to efficiently extract information from received signals. Such applications may include, but are not limited to, video communication and distributions systems, and wireless data and/or voice communications. Such applications may fall into a broad class of systems known as coherent communication systems. These systems typically preserve the phase of a received signal, and allow for the reliable extraction of any information encoded therein.

For coherent communications systems, the quadrature signal representation provides a convenient format for extracting phase information. Moreover, signals represented in the quadrature format allow for the unambiguous detection of positive and negative frequencies centered at baseband. Utilizing the quadrature format of the received signal can make frequency discriminations straightforward.

Techniques for converting a received signal into the quadrature format are known as quadrature sampling, or In-phase/Quadrature (IQ) sampling. Conventionally, this may be accomplished by first down-converting the bandpass signal centered on a carrier frequency to in-phase (I) and quadrature (Q) baseband signals centered at direct current (DC) (i.e. Zero-IF (intermediate frequency)), then sampling these signals with two separate I and Q analog to digital converters (ADCs), as depicted in FIG. 1A. Alternatively, one ADC may be used to sample sequentially I and Q at higher rate (a minimum of two times faster than in FIG. 1A, i.e. a minimum of four times the Nyquist rate), as shown in FIG. 1B. These methods may be referred to as "indirect quadrature sampling" since they involve a frequency translation step before I and Q sampling. On the other hand, a direct quadrature sampling refers to directly sampling signals without a conversion to Zero-IF.

FIG. 1A shows one example of conventional "indirect" quadrature sampling, which may include a local oscillator 118, a phase shifter 116, first and second multipliers 102 and 114, first and second low pass filters (LPFs) 104 and 112, and first and second ADCs 106 and 110. The outputs of the I and Q channels may be passed on to any processing device, for example, a digital signal processor (DSP) 108, or may be recorded digitally for subsequent processing.

FIG. 1B shows another example of a conventional indirect sampling architecture which may replace ADC 106 and ADC 110 with a switch 120 to sample both the I and Q channels sequentially so that only one ADC 122 is needed (albeit sampling at twice the rate) to produce the I and Q samples. Reducing the number of ADCs can improve the IQ matching and reduce the cost. Because the I and Q channels are "serially" sampled by switch 120, the resulting I and Q samples will be misaligned in time by approximately a half sample time, and will have to be temporally aligned subsequent to further processing.

FIG. 1C shows an example of a conventional quadrature sampling at IF frequencies. In this example, the input signal may initially be centered at an RF frequency of 476 MHz. The input signal may be down-converted to an IF signal centered at 4.9 MHz by using a signal multiplier 130 and a 471.1 MHz sinusoidal signal generated by local oscillator (LO) 135. Images in the frequency-shifted may be rejected by filtering with a band pass filter 140. The filtered IF signal may be sampled by ADC 145 using a clock rate with is 4×the IF center frequency (e.g., 19.6 MHz). A demultiplexer 150 may demultiplex the IF samples at twice the IF center frequency (e.g., 9.8 MHz). Each demultiplexed stream may then down-converted to baseband by multiplying (performing sign inversion) the IF signal at a 1×IF center frequency rate (e.g., 4.9 MHz).

The traditional techniques for accurately performing quadrature sampling may be limited to a narrow frequency range (e.g., on the order of one percent) around a single frequency corresponding to the system's sampling clock frequency. This limitation arises because the phase offset between the I and Q samples may drift away from 90 degrees as the frequency of the IF signal deviates from the sampling frequency. Moreover, traditional techniques fail to directly sample the RF input signal and typically require at least one frequency down-conversion step prior to performing the sampling.

Thus, these traditional techniques may not be appropriate for wide-band signals having large fractional bandwidths. Given the ever increasing expectations for improved systems' performance, the use of wide-band signals is becoming more and more commonplace. Conventional approaches that increase the frequency coverage of quadrature ADC's may result in more complex processing architectures. Such approaches may involve frequency conversion to baseband, often using a tunable local oscillator frequency which is appropriately mixed to provide a quadrature signal, and then subsequently sampled by the ADCs. Given the increased complexity of conventional techniques for quadrature sampling of wide-band signals, such implementations may be associated with increased cost, reduced reliability and reduced performance.

Accordingly, there is a need for direct quadrature sampling techniques which may be applicable to wide-band signals, and furthermore avoid the aforementioned issues of the conventional approaches.

SUMMARY

Apparatuses and methods for direct quadrature sampling of signals are disclosed herein. One embodiment for sampling quadrature baseband components of a bandpass signal includes receiving a bandpass signal sampling the bandpass signal using a first sampling clock and a second sampling clock, wherein the first and the second sampling clocks may have the same frequency and are offset by a predetermined phase; and aligning the sampled signals temporally to produce in-phase and quadrature samples corresponding to baseband in-phase and quadrature components.

Another embodiment for sampling quadrature baseband components of a bandpass signal includes receiving a real-valued, bandpass signal; generating a first set of samples by digitizing the bandpass signal using a first analog-to-digital converter (ADC): generating a second set of samples by digitizing the bandpass signal using second ADC, wherein the first and the second ADCs may utilize clock signals having the same frequency and which may be offset by a predetermined phase; and interpolating the first set of samples so that each interpolated sample may be coincident to a corresponding sample in the second set of samples to synchronize the first set of interpolated samples and the second set of samples, wherein the first set of interpolated samples may represent in-phase samples, and the second set of samples may represent quadrature samples of baseband quadrature components.

An embodiment for directly sampling baseband quadrature components of a bandpass signal is further presented. This embodiment may include a first ADC configured to receive a bandpass signal, wherein the first ADC may be coupled to a first clock signal a second ADC configured to receive the bandpass signal and arranged in parallel with the first ADC, wherein the second ADC may be coupled to a second clock signal configured to have a phase offset with respect to the first clock signal; and an interpolator coupled to the first ADC and configured to interpolate a sampled signal associated with the first ADC so that each interpolated sample may be coincident to a corresponding sampled signal from the second ADC.

An embodiment for rejecting images in a quadrature signal directly sampled from a bandpass signal is also presented. One embodiment includes a first analog-to-digital converter (ADC) configured to receive a bandpass signal, wherein the first ADC utilizes a first clock signal a second ADC configured to receive the bandpass signal in parallel with the first ADC, wherein the second ADC may utilize a second clock signal which may have a phase offset with respect to the first clock signal an interpolator coupled to the first ADC and may be configured to interpolate a sampled signal associated with the first ADC, so that each interpolated sample may be coincident to a corresponding sampled signal from the second ADC; a delay element coupled to the second ADC; a phase modulator coupled to the delay element and the interpolator, wherein the phase modulator may generate interference images; and a cancellation module which combines the interference images and baseband components of a quadrature signal.

BRIEF DESCRIPTION OF THE DRAWINGS

The accompanying drawings are presented to aid in the description of embodiments of the disclosure and are provided solely for illustration of the embodiments and are not intended to limit the scope of the disclosure.

FIG. 5 shows graphs depicting the interpolation process used to temporally align the samples produced by the I and Q channels.

DETAILED DESCRIPTION

Figure 1C:
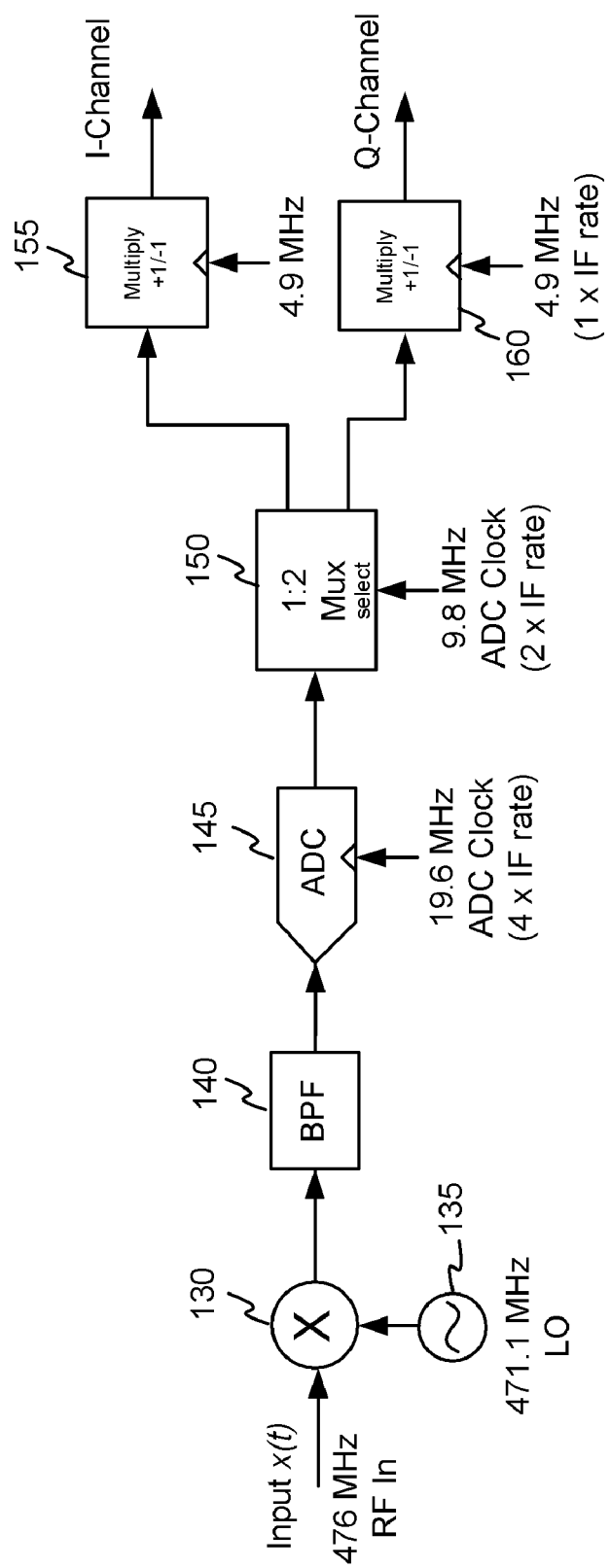
FIGS. 1A, B, and C show block diagrams of three conventional quadrature sampling approaches.

The following description and related drawings are directed to specific embodiments of the disclosed method and apparatus. Alternate embodiments may be devised without departing from the scope of the disclosure. Additionally, well-known elements of the disclosure will not be described in detail or will be omitted so as not to obscure the relevant details being disclosed.

The word "exemplary" is used throughout this disclosure to mean "serving as an example, instance, or illustration." Any embodiment described herein as "exemplary" is not necessarily to be construed as preferred or advantageous over other embodiments. As used throughout this disclosure, the term "direct sampling" means that an analog input signal may be sampled prior to any frequency down-conversion being performed on the input signal.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, by a state machine or by a combination of discrete components or by any combination of these, just to mention a few of the ways in which one of ordinary skill will understand that the disclosed method and apparatus may be implemented. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the disclosed method and apparatus may be embodied in a number of different forms, all of which have been contemplated to be within the scope of the disclosed subject matter. In addition, for each of the embodiments described herein, the corresponding form of any such embodiments may be described herein as, for example, "logic configured to" perform the described action.

Quadrature Signal Representation

The input signal received by a communication system is in general a band-limited, bandpass signal which can be described as a modulated carrier with quadrature modulation components. The actual information is represented by the quadrature modulation components. Designating this signal with x(t), it may be mathematically expressed by the following formula:

$$x(t)=I(t)\cos(\omega_c t)-Q(t)\sin(\omega_c t) \quad (1)$$

where $\cos(\omega_c t)$ and $\sin(\omega_c t)$ are the in-phase and quadrature components of the carrier, respectively, and I(t) and Q(t) are the in-phase and quadrature components, respectively, of the baseband modulation signal. As used herein, the term quadrature baseband components collectively refers to both the I(t) component and the Q(t) component. In general, the carrier radian frequency $\omega_c$ in equation (1) can be any arbitrary frequency. However, as will be discussed below, there may be specific frequencies that can be chosen in eq. (1) to represent a signal that facilitates the extraction of the I and Q samples.

For a given signal x(t) and radian frequency $\omega_c$ in equation (1), the corresponding quadrature baseband components I(t) and Q(t) can be represented using the following formulae:

$$I(t)=x(t)\cos(\omega_c t)+\hat{x}(t)\sin(\omega_c t)) \quad (2)$$

$$Q(t)=\hat{x}(t)\cos(\omega_c t)-x(t)\sin(\omega_c t) \quad (3)$$

where x̂(t) is the Hilbert transform of x(t). A different choice of carrier radian frequency $\omega_c$ results in a different pair of I(t) and Q(t), but all such pairs contain the same information fully describing the signal x(t). The carrier frequency $f_c$ (where $f_c=\omega_c/2\pi$) is typically located in the radio frequency (RF) band, but is not limited to such frequencies. If the bandpass signal spectrum is confined in a limited bandwidth, BW centered around the carrier frequency $f_c$ and if $f_c$ is equal or greater than BW (i.e. the BW≦$f_c$), no spectral overlap or aliasing will occur between the baseband and the band pass signal.

Introduction to Direct Quadrature Sampling

Figure 2:
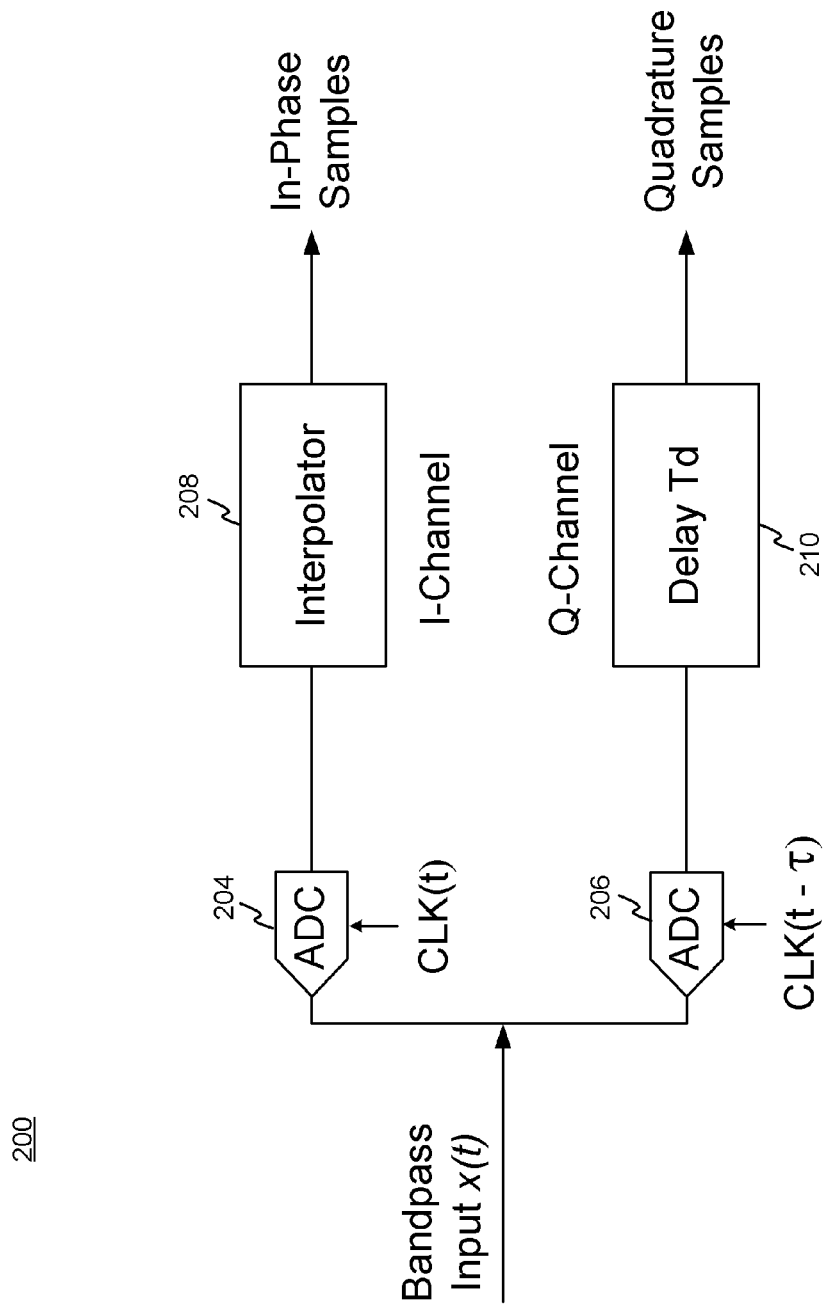
FIG. 2 shows a block diagram of an exemplary direct quadrature sampling analog-to-digital converter (DQS ADC) utilizing shifted sampling clocks.

FIG. 2 shows a block diagram of an exemplary DQS ADC 200. The DQS ADC 200 includes a first ADC 204, a second ADC 206, an interpolator 208, and a time delay unit 210. The DQS ADC 200 is configured as having two parallel channels: an I-channel and a Q-channel. The I-channel includes the first ADC 204 and the interpolator 208 configured in a serial manner. The Q-channel includes the second ADC 206, and the delay unit 210, also configured serially. However, in other embodiments, the interpolator 208 and the delay unit 210 may be interchanged where the interpolator 208 lies in the Q-channel and the Delay unit 210 lies in the I-channel) without materially changing the output of the DQS ADC 200.

The two ADCs 204, 206 may also operate in parallel, each receiving the same bandpass input signal x(t); however, the samples are not output from each ADC at the same time. While both the first ADC 204 and the second ADC 206 are driven by a sampling clock having the same frequency fs, one ADC may have a clock signal which is delayed by a time value τ with respect to the other clock signal. For example, as shown in FIG. 2, the sampling clock driving ADC 206 is delayed by τ with respect to the sampling clock driving ADC 204. To produce accurate in-phase and quadrature samples, the time delay may be a quarter period of the sampling clock frequency $f_s$, which corresponds to a 90 degree relative phase difference at this frequency.

As described above in equations (2) and (3) used to represent the baseband quadrature components, the carrier frequency $\omega_c$ can be chosen arbitrarily as long as the choice is sufficiently high enough to support the bandwidth of the bandpass signal x(t). For the DQS ADC 200, a carrier frequency may be chosen, without any loss of generality, to coincide with the sampling clock frequency $f_s$ (which corresponds to sampling period T), or any harmonics of the sampling frequency. Accordingly, the carrier frequency may be: $f_c=k \cdot f_s (k=1, 2, 3, \ldots)$, or, in terms of the angular frequencies $\omega_c=k\omega_s$ (where $\omega_s=2f_s$). Accordingly, the input bandpass signal x(t) sampled by the DQS ADC 200 may be centered around the ADCs' 204, 206 sampling clock $f_s$ or its harmonics. This means that input signal's spectrum to be sampled may be residing in different Nyquist zones, as will be explained in detail below in the description of FIG. 4.

The input sampled signal x(t) can have the BW of as wide as up to $f_s$, i.e. BW≦$f_s$, spanning up to ½ $f_s$ on each side of the carrier. This may initially appear to contradict the Nyquist theorem, which states that the signal BW can be only up to one half of the sampling rate $f_s$, not the one time this rate. However, because two ADCs that are clocked at different times are used, there is in fact no violation of the Nyquist theorem. The clock rate can be thought of being effectively higher than what is implied by its period T, by relating the sampling rate to the time delay τ between the two clocks, i.e. the effective clock having the frequency of 1/τ (which is higher than $f_s$, e.g. it is equal to 4×fs in the case of a quarter cycle delay τ).

Because the samples from the ADCs 204 and 206 are not coincident in time, further processing is performed in order to properly align them temporally. For example, in the I channel of the DQS ADC 200, the in-phase samples are interpolated by the interpolator 208 so they are substantially coincident with the samples generated by the second ADC 206 in the Q channel. Note that a simple time delay would not be appropriate in this case, because the underlying analog waveforms in the I and Q channels are already time coincident, and one may not be delayed relative to the other. In this case, interpolation is performed because one channel should be resampled to the other channel's sampling time, so the discreet sampled points themselves are substantially coincident, as described later in greater detail in conjunction with FIG. 5.

In order to compensate for the time it takes the interpolator 208 to interpolate the I samples, the Q samples produced by the ADC 206 are delayed by a time delay Td using delay unit 210 that substantially matches the processing time delay in the interpolator 208. Note that if the interpolator was able to resample quickly enough (to within a small fraction of the sampling period T), the delay unit 210 may not be necessary. However, in most practical systems, the delay unit 210 will typically be used. The resulting output samples produced by the two I and Q channels represent the sought-after time-coincident baseband quadrature components I(n) and Q(n), which are further processed and/or stored for subsequent use.

The ADCs 204 and 206 are typically conventional components, and can be used in video processing and distribution applications. The delay unit 210 will typically be a memory (e.g., a nonvolatile memory such as RAM in suitable packaging) which is sized based upon the interpolation delay and the sampling rate $f_s$. The memory may include any suitable storage element, shift register, etc. Details of the interpolation process are presented below in the description of FIG. 5.

It is worth noting that the conditions in the two channels are relative to each other, and only an exemplary case is shown in FIG. 2. The first and second clocks, the delay unit and the interpolator, or the entire channels, can be interchanged. Moreover, the phase shift between the two channels can be negative or positive.

The quadrature conversion performed by the DQS ADC 200 has the advantage of achieving a consistent 90 degree phase difference between the I and Q samples over a broad frequency range, where the input signal's bandwidth (BW) is comparable to the sampling clock frequency $f_s$.

Moreover, DQS ADC 200 utilizes a bandpass sampling approach which avoids the initial frequency down-conversion operation. The bandpass sampling approach works by directly sampling the aliased spectrum in the Nyquist zones 2 and 3. This is explained in more detail below in the description of FIG. 4. The bandpass sampling approach has the advantage of obviating the additional signal multipliers (102, 114), phase shifter (116), and low pass filters (102, 114) used in the conventional QS ADCs shown in FIG. 1. Avoiding these components may reduce cost of the device and improve the phase balance between the I and Q channels.

Theoretical Explanation of Direct Quadrature Sampling

FIG. 3 shows a diagram of an idealized sampler using shifted sampling clocks and their associated sampling functions in the time and frequency domains. The description below is presented to provide theoretical basis for a Direct Quadrature Sampling Analog to Digital Converter (DQS ADC) 200.

Figure 3A:
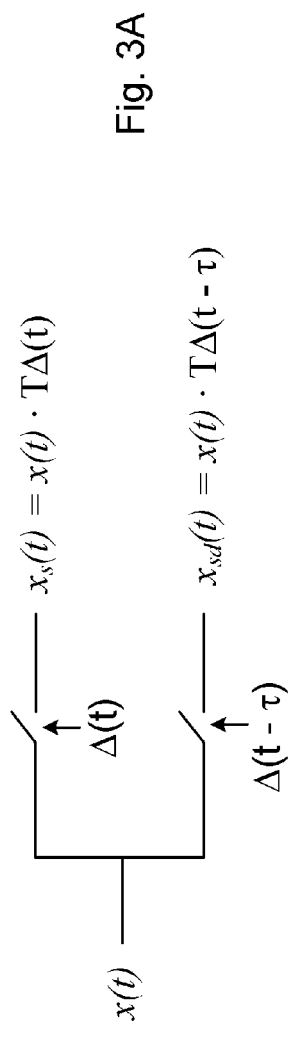
FIG. 3 shows diagrams of an idealized sampler using shifted sampling clocks and the associated sampling functions in the time and frequency domains.

As shown in FIG. 3A, the bandpass input signal x(t) is sampled with two sampling signals. The sampling operation can be mathematically represented as multiplying the input signal by an idealized sampling signal called a comb function $\Delta(t)$. The first sampled signal $x_s(t)$ is produced by multiplying x(t) by a first comb function $\Delta(t)$. The second sampled signal $x_{sd}(t)$ is produced by multiplying x(t) by a second comb function $\Delta(t-\tau)$, which is a time-delayed version of the first comb function. The comb functions are the well known Dirac delta impulse trains which may represent the sampling clock of the ADCs 204 and 206 in the DQS ADC 200. As mentioned above, the sampling clock fundamental frequency is $f_s$ and T is the period of the clock ($f_s=1/T$). The sampled signals may be mathematically represented by the following equations.

$$x_s(t)=x(t)\cdot T\cdot\Delta(t) \quad (4)$$

$$x_{sd}(t)=x(t)\cdot T\cdot\Delta(t-\tau) \quad (5)$$

where T is a scaling factor equal to the sampling period T.

Figure 3B:
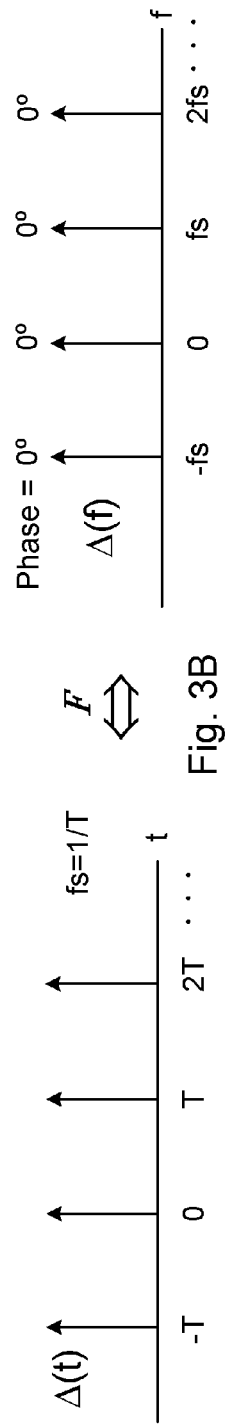

FIG. 3B shows the undelayed sampling comb signal (in the time domain at the left hand side of the figure), sampling at time instants t=0, T, 2T, and its Fourier transform in the right hand side of the figure in the frequency domain, with spectral components spacing equal to the sampling frequency $f_s$. The phases of all spectral components are 0 degrees.

Figure 3C:
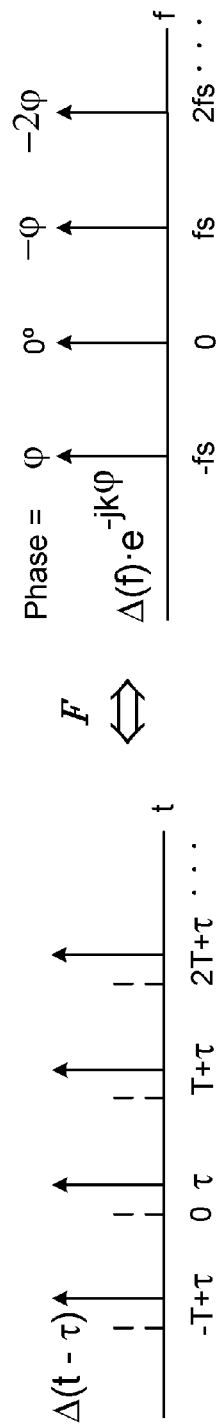

FIG. 3C shows the delayed sampling comb signal $\Delta(t-\tau)$ that samples at delayed time instants t=$\tau$, T+$\tau$, 2T+$\tau$, . . . , and its Fourier transform in the frequency domain, with spectral components spaced at the sampling frequency $f_s$ as in FIG. 3B. However, the frequency components here have the phases of the spectral components varying as the function of the harmonic number and the delay $\tau$, or the phase $\phi$ as defined below.

Mathematically speaking, the delayed sampling comb in (5) may be expressed using the formula for the delta-function, which represents the pulse train as a Fourier series:

$$T\cdot\Delta(t-\tau)=T\cdot\sum_{n=-\infty}^{\infty}\delta(t-\tau-nT)= \quad (6)$$

$$\sum_{k=-\infty}^{\infty}\exp\left[j2\pi kf_s(t-\tau)\right]=\sum_{k=-\infty}^{\infty}\exp[j2\pi kf_s t-jk\varphi]$$

where k=0, ±1, ±2, . . . is the harmonic number and k$\phi$ is the phase of the corresponding spectral component, $\phi$ is the phase of the delayed clock (of the fundamental component for k=1):

$$\varphi=2\pi\cdot f_s\cdot\tau=2\pi\cdot\tau/T \quad (7)$$

Substituting (6) into (5), the Fourier transform, $X_{sd}(f_s)$ of the delayed sampled signal $x_{sd}(t)$ may be computed as:

$$X_{sd}(f)=F\{x_{sd}(t)\}= \quad (8)$$

$$F\left\{x(t)\cdot\sum_{k=-\infty}^{\infty}\exp[j2\pi kf_s(t-\tau)]\right\}=\sum_{k=-\infty}^{\infty}X(f-kf_s)\exp(-jk\varphi)$$

X(f) is the Fourier transform of the original signal x(t): X(f)=F{x(t)}.

Replacing delay $\tau$ or phase $\phi$ with zero in equation (8), the Fourier transform of the undelayed sampled signal $x_s(t)$ is obtained by:

$$X_s(f)=F\{x_s(t)\}=\sum_{k=-\infty}^{\infty}X(f-kf_s) \quad (9)$$

The two spectra in (8) and (9) have the same magnitude (which is the replicated spectrum of the original signal x(t) translated and centered around the sampling clock harmonics). The difference is in the phase term k$\phi$—the phase between the two spectra is proportional to the harmonic number and the time delay $\tau$. For example, for k=1 (fundamental) the quadrature condition occurs when $\tau$ is a quarter cycle delay ($\tau$=T/4 per equation (7)), i.e. the delayed clock is phase shifted by -90° relative to the undelayed clock. It may be shown that for any value of k (except 0), a delay $\tau$ can be adjusted to achieve the quadrature condition at the corresponding harmonic frequency.

For a singular case of k=0, both spectra in (8) and (9) are identical to the original signal spectrum X(f) and the phase shift between the two is 0 regardless of the amount of delay $\tau$. This case would correspond to the baseband sampling when the signal spectrum is below the half clock frequency, i.e. between DC and ±½$f_s$. All other values of k correspond to the harmonic, or bandpass sampling, the focus of the present disclosure.

With the above analysis of the spectral phase relationship, a more direct way using delta function directly is derived next for k=1. The un-delayed sampling comb can be expressed by replacing 0 for $\tau$ in (6) and expanding this equation:

$$T\cdot\Delta(t)=1+2\cos(\omega_s t)+2\cos(2\omega_s t)+2\cos(3\omega_s t)+/- \quad (10)$$

For the special case of quarter cycle delay the comb can be expressed also from (6):

$$T\cdot\Delta(t-T/4)=1+2\cos(\omega_s t-\pi/2)+2\cos(2\omega_s t-\pi)+2\cos(3\omega_s t-3\pi/2)+ \quad (11)$$

After sampling (and subsequent quantization and conversion to digital domain in the ADC), in the digital representation only frequencies that get converted into the first Nyquist zone exist—terms falling outside of this zone are not present in the digital representation. This is because frequency range in the digital domain is limited or confined to one half the data clock rate, i.e. ½$f_s$. Therefore, if the input signal spectrum is contained in the 2 and 3 Nyquist zones, i.e. between ½fs and 3/2 $f_s$, only the conversion terms due to the fundamental frequency $f_s$ will fall in the first Nyquist zone and will be the only terms represented in the digital domain. Conversion product due to DC, or second, third and so on clock harmonics that in this example fall outside of the first Nyquist zone will not exist in the digital domain. Thus, taking only the second term (corresponding to $f_s$) in equations (10) and (11) and substituting in (4) and (5), respectively, yields:

$$x_s(t)=x(t)\cdot T\cdot\Delta(t)=x(t)\cdot 2\cos(\omega_s t) \quad (12)$$

$$x_{sd}(t)=x(t)\cdot T\cdot\Delta(t-\tau)=x(t)\cdot 2\sin(\omega_s t) \quad (13)$$

As described above in the description of FIG. 2, the carrier frequency $\omega_c$ of x(t) can be chosen to be the radian sampling frequency $\omega_s$ as indicated below.

$$\omega_c=k\cdot\omega_s \Rightarrow x(t)=I(t)\cos(k\omega_s t)-Q(t)\sin(k\omega_s t) \quad (14)$$

where $\omega_s$ is the sampling clock frequency and k=1, 2, 3, . . . is the clock's harmonic number. Note that the judicious choice of the carrier frequency being set to the sampling frequency $\omega_s$ is what allows us to ignore all but the second terms of equations (10) and (11) for the representation of $x_s(t)$ and $X_{sd}(t)$ shown in (12) and (13). This choice of carrier frequency allows the DQS ADC 200 to omit the use of low pass filters in the I and Q channels.

Substituting x(t) from (14) into (12) and (13), for k=1, we may show that the sampled signals actually represent the baseband quadrature components I(t) and Q(t):

$$x_s(t)=I(t)+[I(t)\cos(2\omega_s t)-Q(t)\sin(2\omega_s t)] \Rightarrow I(t) \qquad (15)$$

$$x_{sd}(t)=-Q(t)+[Q(t)\cos(2\omega_s t)+I(t)\sin(2\omega_s t)] \Rightarrow Q(t) \qquad (16)$$

In the above equations the terms at twice the $f_s$ frequency do not yield any signals in the digital representation for the same reason as stated above, and as such can be abstracted out, so that only I(t) and Q(t) terms remain, as depicted with arrows in Eq. (15) and (16). Note that continuous time representations have been used in the above equations (15) and (16) to show that the sampled input signal $x_s(t)$ indeed corresponds to the baseband in-phase component I(t), and the input signal sampled with the delayed sampling signal $x_{sd}(t)$ corresponds to the baseband quadrature component Q(t). In a practical system the baseband components will be discreet time signals having differing time indices (e.g., I(n) and Q(m)). Creating a common time index for both signals is what the above mentioned interpolator 208 creates. Details of the interpolator will be presented in the description of FIG. 5 below.

Figure 6:
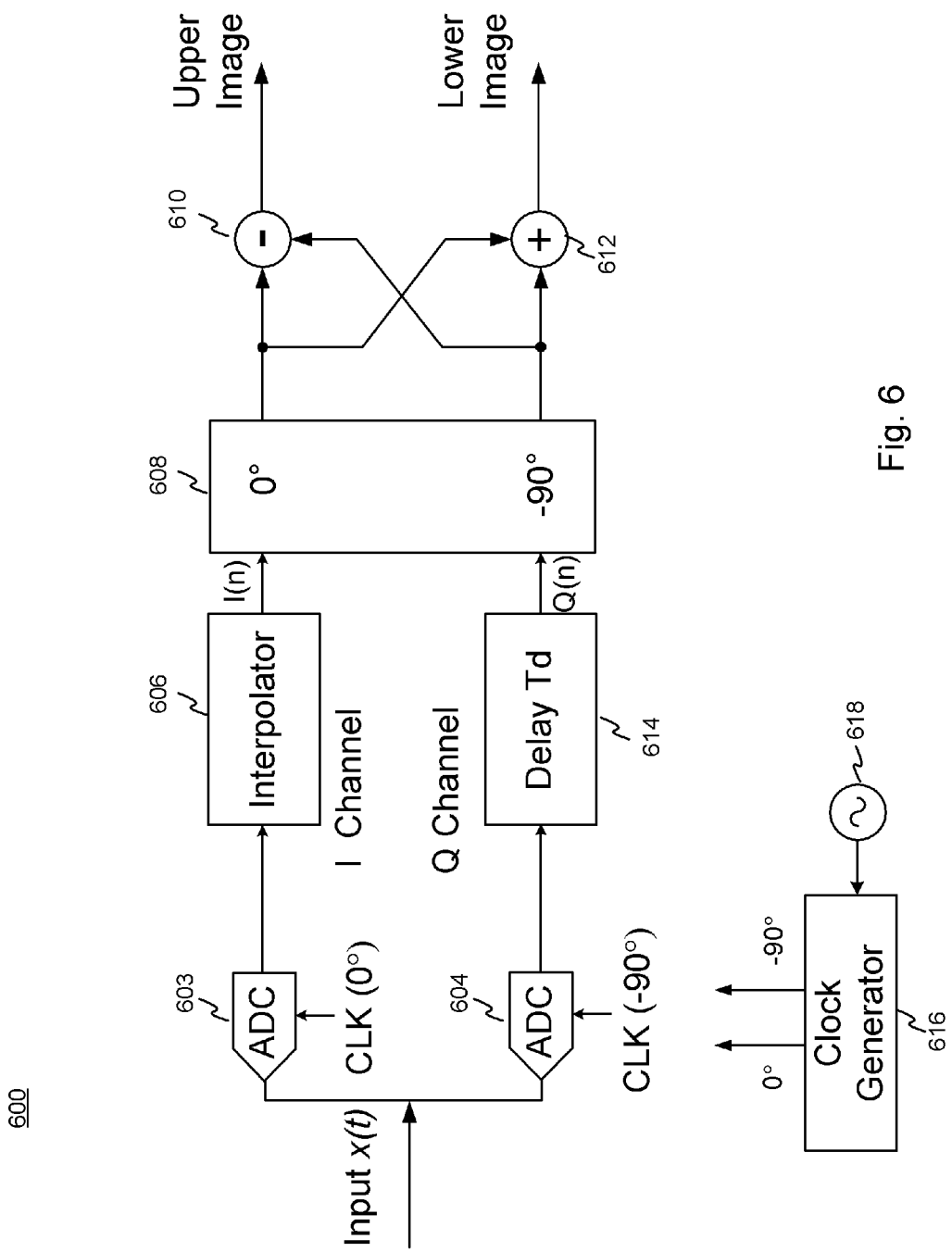
FIG. 6 shows a top-level block diagram of an exemplary technique for the image rejection of signals processed by the quadrature sampling analog-to-digital converter.

FIGS. 4A-4E show exemplary processes of image rejection which are achieved by various embodiments the disclosure, an example of which is shown in FIG. 6.

Figure 4A:
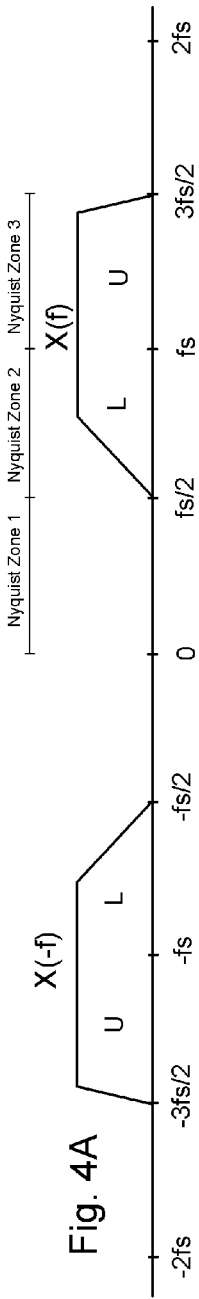
FIG. 4 shows diagrams of the spectral images of the bandpass input signal and baseband images in both the in-phase and quadrature channels.

FIG. 4A shows an exemplary spectrum X(t) of the input bandpass signal x(t), which is sampled in accordance with the embodiment shown FIG. 2. The spectrum X(f) is centered about the sampling clock frequency +$f_s$, and has a spectral mirror image centered at –$f_s$. This symmetric spectral images about 0 Hz is the result of x(t) being a real valued signal. The spectrum X(f) occupies a bandwidth BW of ±½$f_s$ around the sampling frequency $f_s$. For instance, if the clock frequency is 1 GHz, the bandpass signal's BW can be up to 1 GHz, spanning from 0.5 to 1.5 GHz and centered at 1 GHz. The upper half of the spectrum is designated as "U", and a lower portion of the spectrum is designated as "L".

FIG. 4A further shows that X(f) falls within two specific regions of spectra known as Nyquist zones 2 and 3. The Nyquist zones are portions of the continuous frequency spectra which are divided into an infinite number of $f_s/2$ frequency bands. Each one of these bands is called a Nyquist zone. The frequency spectrum between DC and $f_s/2$ is known as the first Nyquist zone. The range between ½$f_s$ and $f_s$ is known as the second Nyquist zone, and so on.

Figure 4B:
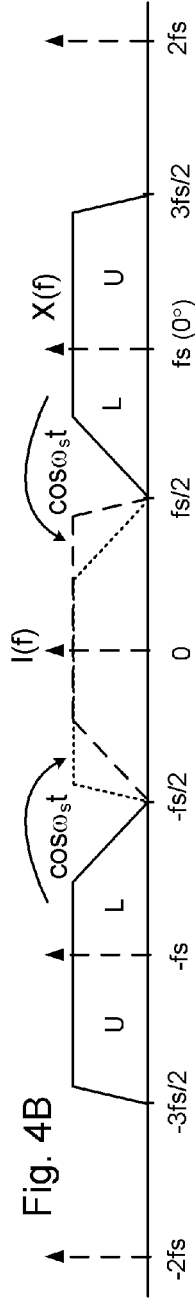
Figure 4C:
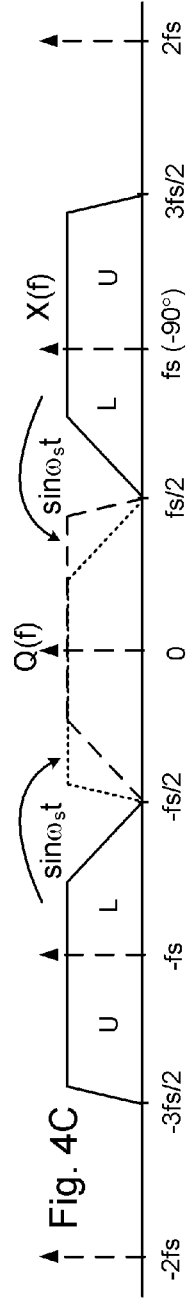
Figure 4D:
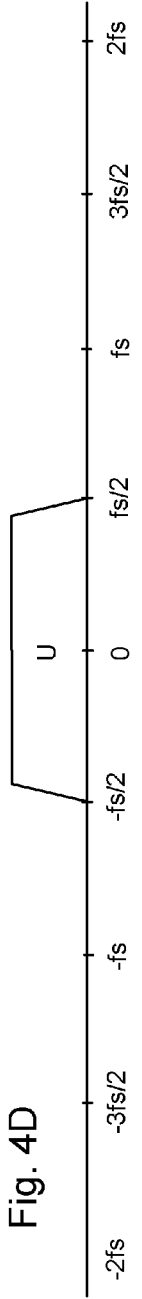
Figure 4E:
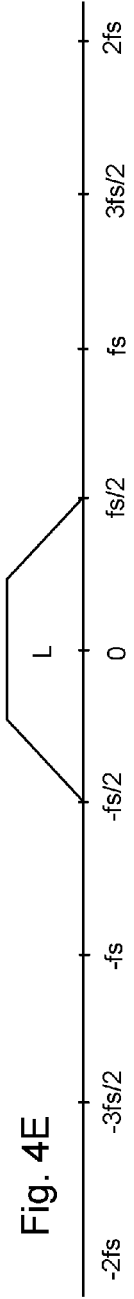

FIG. 4B and FIG. 4C illustrate how the baseband spectral components I(f) and Q(f) are obtained by shifting the spectrum X(f) by the first ADC clock 204 and the second ADC clock 208, respectively. By sampling the signal x(t) in Nyquist zones 2 and 3, the DQS ADC 200 directly performs bandpass sampling. This bandpass sampling operation actually folds (or aliases) the frequency components of the I and Q components down into the first Nyquist zone. This frequency folding effect, shown by the arrows in FIG. 4B and FIG. 4C, can be interpreted as replacing the mixing operation performed in conventional quadrature sampling ADCs shown in FIG. 1. Shifting the phase of Q(f) by 90°, the two images rotate in opposite directions, such that one will be in phase with the I(f), and the other out of phase. Combining the phase shifted or rotated versions of Q(f) with I(f) yields the separated upper and lower images, as depicted in FIGS. 4D and E, respectively, and detailed later along with the description of FIG. 6.

Various embodiments of the disclosure provide quadrature samples of signals in specific Nyquist zones depending on the value of the time delay τ. As mentioned above and illustrated in FIG. 4A, the Nyquist zones are defined with respect to the sampling clock: the first zone is defined from 0 to ½$f_s$, the second from ½$f_s$ to $f_s$, third from $f_s$ to 3/2 $f_s$ and so on. By selecting the appropriate time delay signals in different Nyquist zones can be quadrature sampled under the following conditions described below.

The quadrature conditions occur when kφ=π/2 or odd multiples of π/2, with φ earlier defined in equation (7), which translates to τ/T=1/(4k).

For τ/T=1/(4k), Nyquist zones 2(k+4m) and 2(k+4m)+1, k=1, 2, 3, . . . (the zones repeat at k modulo 4) and for m=0, 1, 2, 3, . . . are covered. Number k is the clock harmonic around which the first signal band that can be processed with this method is centered, and m in combination with k determines the zone index. For example, for k=1 ⇒τ=T/4 (90° at the fundamental clock frequency), covered are Nyquist zones: 2 and 3 (m=0), 10 and 11 (m=1), etc.

In another example, when k=3 (target is the band around third harmonic of the clock) ⇒τ=T/12 (30° at fundamental clock ⇒90° at the third harmonic), which cover Nyquist zones 6 and 7 (m=0), 14 and 15 (m=1), etc.

FIG. 5 shows graphs illustrating the interpolation process which is performed by interpolator 208 to temporally align the samples produced by the I and Q channels. FIG. 5A and 5B show the sampling of the baseband signals I(t) and Q(t), respectively. As described above and shown in equations (15) and (16), the actual samples are obtained by sampling the signal x(t). However, at the sampling instants, the samples represent only their respective baseband waveforms. The I samples "pick" the I(t) waveform only, and the Q samples pick the value of the Q(t) waveform only. This occurs because the carrier components in (14) are in quadrature or, in other words, mutually orthogonal (when one is 1, the other is 0, and vice versa), and because the sampling clock is coherent and phase aligned with the carrier. This occurs due to the choice of the carrier frequency $\omega_c$ being assigned the same value as the sampling frequency $\omega_s$. The motivation for this choice was to produce the above-described result.

To digitally represent I(t) and Q(t) correctly the I and Q samples should be concurrent in time, i.e. they should represent the values of the respective waveforms at the same instants of time. From a discrete time perspective, the interpolation process allows the sample points from both I and Q channels to be represented by a common time index. For example, the samples in FIG. 5A and 5B are time shifted with respect to each other by a time value τ, and should be re-aligned to a common time index. This is achieved by an interpolator (e.g., 206) which generates the waveform values located in-between the sampled points.

The results of the interpolation are shown in FIG. 5C, where, for example, new I samples at the time instants offset by τ are precisely aligned with the Q samples. The interpolated I samples shown in FIG. 5C, and the originally sampled Q samples shown in FIG. 5B, are a time-aligned I, Q pair, which may be ready for further digital processing.

The values of time shifted samples may be computed using any appropriate interpolation algorithm known in the art. There are a wide variety of interpolation approaches which may be used. Such examples include convolutional interpolation using finite impulse response (FIR) filters, polynomial interpolation, cubic spline interpolation, and/or sample and hold interpolation.

Convolutional interpolation is an approach commonly used in the signal processing arts because the filters used are well understood, the implementations is very flexible, the quality of the interpolant are easily specified, and a wide variety of efficient hardware and software implementations are available for selection. With convolutional interpolation, a reconstruction formula for a sampled waveform computes the convolution of the sampled waveform with the impulse response of the reconstruction filter (for example, a weighted sinc function in time domain). The process computes the value of the sample at the new time instants (in the example shown in FIG. 5C, at time points shifted by τ). To compute the interpolated value, a certain number of samples (e.g., N) needs to be accumulated (incurring a corresponding number of clock cycles delay) before the convolution can be calculated. The length N of the sequence depends on the required accuracy—the more accurate interpolation required, the longer the sequence needs to be.

To compensate for the time delay associated by the interpolator 208, an equal, matching time delay may be inserted in the other channel (in this case the Q channel), as shown in FIG. 2.

Applications of Direct Quadrature Sampling

FIG. 6 shows a top-level block diagram of an exemplary image rejection receiver 600 utilizing quadrature signals processed by a direct quadrature sampling analog-to-digital converter.

The front end of the image rejection receiver 600 includes similar components shown in the DQS ADC 200 depicted in FIG. 2. These components include a first and second ADC 603 and 604, an interpolator 606, and a delay unit 614. Explicitly shown in FIG. 6 are some sampling clock generation components including a reference local oscillator 618 and a clock generator 616. The clock generator 616 provides two clock signals each having the same sampling frequency $f_s$, but are offset in phase by 90 degrees. The sampling clock signal having a zero degree phase offset is provided to the first ADC 603. The second sampling clock signal having the −90 degree phase offset is provided to ADC 604. The operation of the front end of the receiver 600 is similar to the DQS ADC 200, and its description will not be repeated here. The front end of the receiver provides as output I and Q samples I(n) and Q(n) which are properly aligned in time.

The phase of the I and Q samples are altered so that the relative phase difference between each I, Q sample pair is −90 degrees. This phase adjustment is performed by a digital phase shifting unit 608. The digital phase shifting unit may be implemented using, for example, a Hilbert transformer or a polyphase filter.

After being output from the digital phase shifting unit 608, each sample Q(n) is subtracted from a corresponding sample I(n) by subtractor unit 610, and then output as the upper image of the input signal x(t). Each sample I(n) is added to each Q(n) sample by adder 612, and resulting signal output as the lower image of x(t).

Provided below is an exemplary mathematical description of the signal processing which takes place in image rejection receiver 600. A signal x(t) with both an upper sideband spectrum and lower sideband spectrum (which are different from each other, not the double sideband modulation of the same signal; that is, each sideband carries different information) is represented with unmodulated carriers for the purpose of image rejection analysis. The input signal is represented as:

$$x(t)=\cos(\omega_s-\omega_t)t+\cos(\omega_U+\omega_s)t \quad (17)$$

Using equations (12) through (17):

$$I(t)=\cos(\omega_L t)+\cos(\omega_U t) \quad (18)$$

$$Q(t)=-\cos(\omega_L t-90°)-\cos(\omega_U t+90°) \quad (19)$$

Shifting the phase in the Q channel by −90° yields:

$$Q_s(t)=\cos(\omega_L f)-\cos(\omega_U t) \quad (20)$$

Where the $Q_s(t)$ is the quadrature component phase-shifted by −90°. Summing (18) and (20) yields the lower sideband (the upper image is rejected), while subtracting the (20) from (18) provides the upper sideband (rejecting the lower image), thus accomplishing the Image Reject/Sideband extraction operation.

As mentioned above, the 90° phase shift may be realized digitally by well known DSP methods. Moreover, this operation may be combined with/designed as part of the interpolator 606 and delay unit 614 functionality for a more efficient digital signal processing implementation. Additionally, the image rejection/extraction is typically performed using other known techniques, including a Weaver architecture and/or a Hartley architecture.

The conditions in the I, Q channels are relative to each other, only the exemplary cases are shown in the abovementioned Figures. The first and second clocks, the delay and the interpolator, or the entire channels can be interchanged. Also, the phase shift between the two channels can be negative or positive. The correct images at the output can be obtained by using the appropriate summations signs (+or −), matching the chosen phasing condition.

Figure 7:
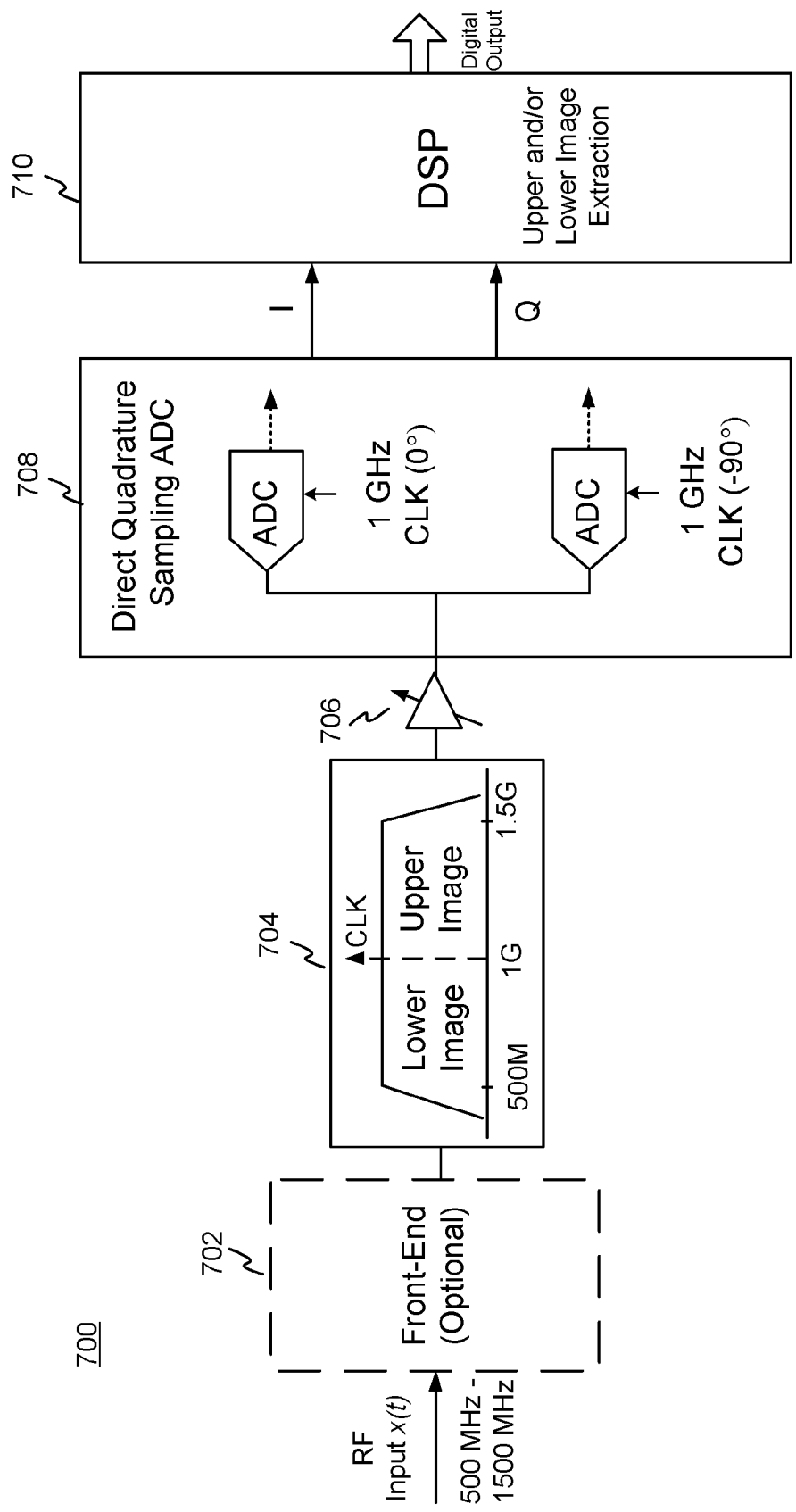
FIG. 7 shows an exemplary image rejection receiver which builds upon the embodiment shown in FIG. 6.

FIG. 7 shows an exemplary image rejection receiver 700 which builds upon the embodiment shown in FIG. 6. In this embodiment, an RF input signal is presented to an optional front end unit 702. The input signal x(t) is an RF signal centered at 1 GHz, and having a 1 GHz bandwidth. The optional front end 702 includes low noise amplification (LNA), automatic gain control (AGC), and/or slope control (SLC). The signal is then be passed through an optional band pass filter to reject any unwanted frequency artifacts. The band pass filter 704 is centered on 1 GHz, and has a 1 GHz bandwidth. The filter signal is then conditioned by an optional amplifier and/or automatic gain control 706. The signal is output to a DQS ADC 708 having two ADCs clocked at 1 GHz, where the phase of the sample clock signal driving the ADC in the Q channel are shifted −90 degrees with respect to the sampling clock driving the I channel ADC. The DQS ADC provides in-phase and quadrature samples I(n) and Q(n) to the DSP 710, which may perform upper and/or lower image extraction using known aforementioned image rejection techniques.

Figure 8:
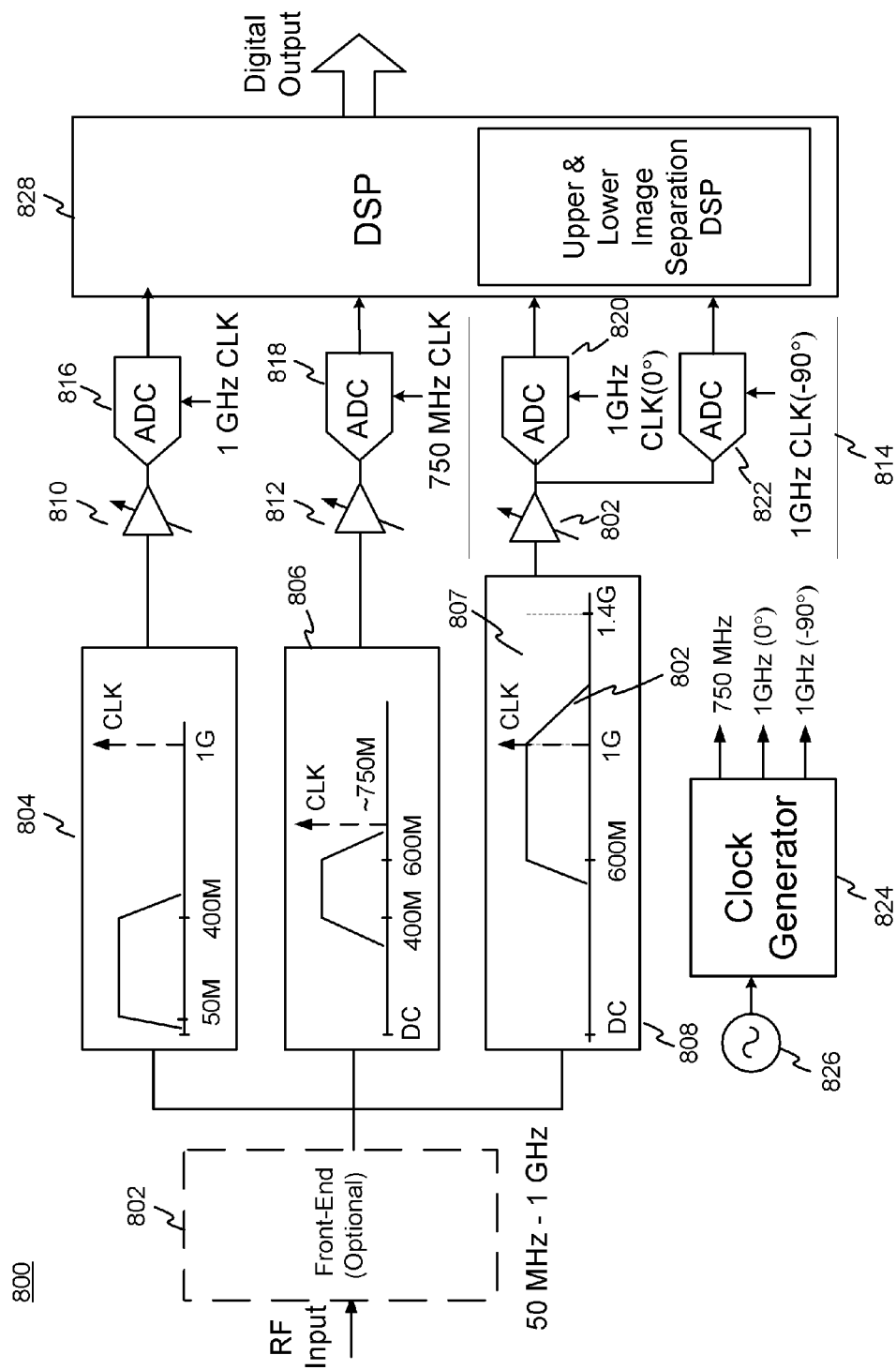
FIG. 8 shows a block diagram of an exemplary multichannel tuner having a channel utilizing the image rejection technique.

FIG. 8 shows a block diagram of an exemplary multi-channel tuner with diplexed frequency bands having a channel utilizing image rejection. In this embodiment, an RF input signal is initially presented to an optional front end unit 802. The input signal x(t) is an RF signal centered at 1 GHz, and has a spectrum between 50 MHz and 1 GHz. The optional front end 802 includes low noise amplification (LNA), automatic gain control (AGC) and/or slope control (SLC). The signal is then passed through an set of triplex filters 804, 806, and 808. The filter 804 is be a bandpass filter having a spectrum ranging between 50 MHz-400 MHz. The filter 806 has a spectrum ranging between 400 MHz to 600 MHz. The filter 808 has a spectrum ranging between 600 MHz to 1 GHz. Each of the bands in filters 804, 806, and 808 have different center frequencies.

The signal provided at the output of filter 804 can be optionally amplified by amplifier 810, and sampled by ADC 816 which is driven by a sampling clock frequency of 1 GHz. The samples from ADC 816 are forwarded to DSP 828 for subsequent processing. The signal provided by filter 806 can be optionally amplified by amplifier 812, and sampled by ADC 818. The ADC 818 is driven by a sampling clock signal having a 750 MHz frequency.

The filter 808 has an undesirable image band 807 which is to be rejected using image rejection processing. Moreover, image rejection processing permits a wider transition band 802 which allows a lower order filter, or in some cases, no filter may be required. This approach rejects other images in close proximity which otherwise could require higher-order filters. The output of the filter 808 cab be optionally passed through amplifier 802, and then provided to a DQS ADC 814. The DQS ADC 814 has one ADC 820 driven by a 1 GHz clock, and another ADC 822 driven by a clock with the same frequency, but has a relative phase difference of −90 degrees.

The sampling clocks are supplied by a clock generator 824 which is driven by a local oscillator reference 826. The clock generator supplies three sampling clocks signals: one having a frequency of 750 MHz, and the other two having a frequency of 1 GHz. The two 1 GHz clocks have a relative phase difference of 90 degrees. The DQS ADC 814 provides in-phase and quadrature samples I(n) and Q(n) to the DSP 828, which performs image rejection on the upper band of filter 808 using any of the aforementioned known image rejection techniques.

Figure 9:
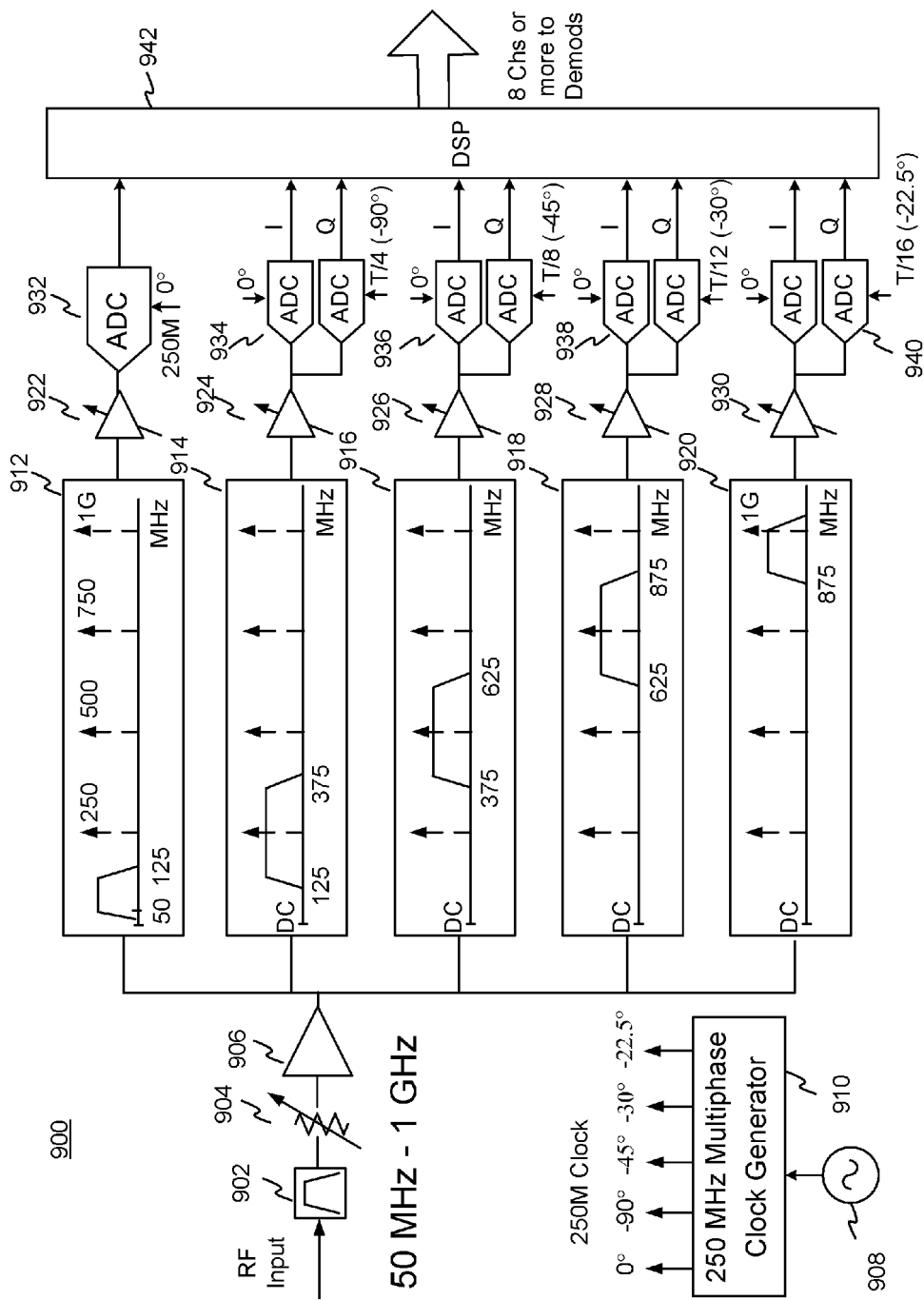
FIG. 9 shows a block diagram of an exemplary multichannel image rejection tuner having a plurality of phased sampling clocks driving an array of analog-to-digital converters.

FIG. 9 shows a block diagram of an exemplary multi-channel image rejection tuner 900 having a plurality of phased sampling clocks driving an array of analog-to-digital converters. In this embodiment, an RF input signal can be optionally conditioned by band pass filter 902, variable attenuator 904, and amplifier 906. The signal is then be split into five separate channels, each having a separate band pass filters 912-920, variable amplifiers 922-930, and digitizers 932-940. The ADC 932 in the first channel is a standard ADC driven by a 250 MHz clock with no phase offset. The remaining digitizers 934-940 are DQS ADCs. DQS ADC 934 has a 90 degree phase difference between the sampling clock signals, DQS ADC 936 has a 45 degree phase difference between the sampling clock signals, DQS ADC 938 has a 30 degree phase difference between the sampling clock signals, and DQS ADC 940 has a 22.5 degree phase difference between the sampling clock signals. All of the sampled outputs from each of the five channels are passed onto the DSP 942. ADC 932 only provides real samples, where DQS ADCs 934-940 each provide separate I and Q samples to the DSP 942.

A 250 MHz multiphase clock generator 910, which is driven by a local reference oscillator 908, can provide the five clock signals having a 250 MHz frequency, which offset from the first clock signal by −90, −45, −30, and −22.5 degrees, respectively.

The multichannel image rejection tuner 900 has an advantage over conventional architectures because it uses multiple ADCs operating at a lower clock frequency versus one ADC operating at a high clock frequency. Furthermore, if any calibration of the system is needed to achieve the required performance, such as phase and/or amplitude matching of the I and Q clocks, this embodiment provides a significant advantage in accomplishing this task. This is due to the degrees of freedom associated with this embodiment for achieving the processing without any conflicting requirements between different ADC pairs. Each of the quadrature sampling ADC pairs uses only one harmonic of the sampling clock to process their respective signals, thus for each ADC pair, the calibration is performed only on the harmonic in question. Accordingly, the calibration can be done separately and independently for each of the ADC pairs, free of any conflicting requirements between different ADC pairs.

In the transitional frequencies at the filters boundaries the rejection of filters are limited and there may be overlap of the sampled signals from near the edges of adjacent Nyquist zones. Such overlap would cause a mutual interference of the signals from those regions, falling of top of each other in the digital domain. In that case the overlapped interfering signals can be removed by some of the well known DSP techniques, such as, for example, using correlation techniques.

It will be appreciated that information and signals can be represented using any of a variety of different technologies and techniques. For example, data, instructions, commands, information, signals, bits, symbols, and chips that are referenced throughout the above description can be represented by voltages, currents, electromagnetic waves, magnetic fields or particles, optical fields or particles, or any combination thereof.

Further, it will be appreciated that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The methods, sequences and/or algorithms described in connection with the embodiments disclosed herein can be embodied directly in hardware, or as a combination of hardware and software. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor.

Accordingly, the disclosure is not limited to illustrated examples and any means for performing the functionality described herein are included in embodiments of the disclosure.

While the foregoing discussion shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method for sampling quadrature baseband components of a bandpass signal, comprising:
   receiving a bandpass signal;
   sampling the bandpass signal using a first sampling clock and a second sampling clock, wherein the first and the second sampling clocks have the same frequency and are offset by a predetermined phase; and aligning the sampled signals temporally to produce in-phase and quadrature samples corresponding to baseband in-phase and quadrature components.

2. The method according to claim 1, wherein the aligning further comprises:

interpolating the sampled signal associated with the first clock so that each interpolated sample is substantially coincident to a corresponding sample associated with the second clock.

3. The method according to claim 2 further comprising:

delaying the sampled signal associated with the second clock to compensate for the interpolation processing delays.

4. The method according to claim 2, wherein interpolation comprises one of finite impulse response (FIR) filter interpolation, polynomial interpolation, or sample and hold interpolation.

5. The method according to claim 1, further comprising:

selecting the predetermined phase offset to specify a Nyquist zone of the bandpass signal which will be used for sampling the baseband quadrature components.

6. The method according to claim 5, further comprising:

choosing a harmonic of the sampling frequency to specify the Nyquist zone.

7. The method according to claim 1, wherein the frequency of the first and the second sampling clocks is a center frequency of the bandpass signal.

8. The method according to claim 1, further comprising:

performing image rejection on the baseband signal, wherein the image rejection further comprises shifting the relative phase between the in-phase samples and the quadrature samples so that that the quadrature samples lag by 90 degrees;

adding the in-phase samples to the shifted quadrature samples to generate a lower image; and subtracting the shifted quadrature samples from the in-phase samples to generate an upper image.

9. The method according to claim 8, further comprising:

filtering the bandpass signal with a bandpass filter which is centered on the sampling frequency.

10. A method for sampling quadrature baseband components of a bandpass signal, comprising:

receiving a real-valued, bandpass signal;

generating a first set of samples by digitizing the bandpass signal using a first analog-to-digital converter (ADC);

generating a second set of samples by digitizing the bandpass signal using second ADC, wherein the first and the second ADCs utilize clock signals having the same frequency, and which are offset by a predetermined phase; and interpolating the first set of samples so that each interpolated sample is substantially coincident to a corresponding sample in the second set of samples to synchronize the first set of interpolated samples and the second set of samples, wherein the first set of interpolated samples represent in-phase samples, and the second set of samples represent quadrature samples of baseband quadrature components.

11. The method according to claim 10, wherein the synchronizing further comprises:

delaying the second set of samples to compensate for interpolation processing delays.

12. The method according to claim 10, wherein interpolation comprises one of finite impulse response (FIR) filter interpolation, polynomial interpolation, or sample and hold interpolation.

13. The method according to claim 10, further comprising:

selecting the predetermined phase offset to specify a Nyquist zone of the bandpass signal which will be used for sampling the baseband quadrature components.

14. The method according to claim 13, further comprising:

choosing a harmonic of the clock frequency to specify the Nyquist zone.

15. The method according to claim 10, wherein the center frequency of the bandpass signal is the same frequency as the clock frequency.

16. The method of according to claim 10, further comprising:

performing image rejection on the baseband signal, wherein the image rejection further comprises shifting the relative phase between the in-phase samples and the quadrature samples so that that the quadrature samples lag by 90 degrees;

adding the in-phase samples to the shifted quadrature samples to generate a lower image; and subtracting the shifted quadrature samples from the in-phase samples to generate an upper image.

17. The method according to claim 16, further comprising:

filtering the bandpass signal with a bandpass filter which is centered on the sampling frequency.

18. An apparatus for directly sampling baseband quadrature components of a bandpass signal, comprising:

a first analog-to-digital converter (ADC) configured to receive a bandpass signal, wherein the first ADC s coupled to a first clock signal;

a second ADC configured to receive the bandpass signal and arranged in parallel with the first ADC, wherein the second ADC is coupled to a second clock signal configured to have a phase offset with respect to the first clock signal; and an interpolator coupled to the first ADC and configured to interpolate a sampled signal associated with the first ADC so that each interpolated sample is substantially coincident to a corresponding sampled signal from the second ADC.

19. The apparatus according to claim 18, further comprising:

a delay element coupled to the second ADC, wherein the delay element is configured to delay each sampled signal from the second ADC so that each interpolated sample is synchronous to the corresponding sampled signal from the second ADC.

20. The apparatus according to claim 19, wherein the delay element is a memory configured to store the sampled signal associated with the second ADC to compensate for interpolation processing delays.

21. The apparatus according to claim 18, wherein the interpolator further comprises one of finite impulse response (FIR) filter interpolation, polynomial interpolation, or sample and hold interpolation.

22. The apparatus according to claim 18, wherein the first and second clock signals have a common frequency which is a center frequency of the bandpass signal.

23. The apparatus according to claim 18, wherein the phase offset is selected to specify a Nyquist zone of the bandpass signal which will be used for sampling the baseband quadrature components.

24. The apparatus according to claim 18, further comprising a band pass filter placed at the input of the apparatus.

25. An apparatus for rejecting images in a quadrature signal which was directly sampled from a bandpass signal, comprising:

a first analog-to-digital converter (ADC) configured to receive a bandpass signal, wherein the first ADC utilizes a first clock signal;

a second ADC configured to receive the bandpass signal in parallel with the first ADC, wherein the second ADC utilizes a second clock signal which has a phase offset with respect to the first clock signal;

an interpolator coupled to the first ADC and configured to interpolate a sampled signal associated with the first ADC so that each interpolated sample is substantially coincident to a corresponding sampled signal from the second ADC;

a delay element coupled to the second ADC;

a phase modulator coupled to the delay element and the interpolator, wherein the phase modulator generates interference images; and a cancellation module which combines the interference images and baseband components of a quadrature signal.

26. The apparatus according to claim 25, wherein the phase modulator further comprises:

a phase shifting unit which creates a 90 degree phase lag between the in-phase and quadrature components of the quadrature signal; and an adder and a subtractor unit, coupled to the phase shifting unit, which combines the in-phase and quadrature components to generate and upper image and a lower image.

27. The apparatus according to claim 26, wherein the phase shifting unit comprises a Hilbert transformer or a polyphase filter.

28. The apparatus according to claim 25, wherein the phase modulator and the cancellation module further comprise a Weaver architecture or a Hartley architecture.

29. The apparatus according to claim 25, wherein the interpolator further comprises one of finite impulse response (FIR) filter interpolation, polynomial interpolation, or sample and hold interpolation.

30. The apparatus according to claim 25, wherein the first and second clock signals have a common frequency which is the same as a center frequency of the bandpass signal.

31. The apparatus according to claim 25, wherein the phase offset is selected to specify a Nyquist zone of the bandpass signal which will be used for sampling the baseband quadrature components.

* * * * *